United States Patent [19]

Lewis et al.

[11] Patent Number: 4,610,432
[45] Date of Patent: Sep. 9, 1986

[54] BREAK-AWAY FENCE FOR HORSE RACE TRACKS

[75] Inventors: Robert T. Lewis; George F. Dwyer, Jr.; John W. Payne, all of Louisville, Ky.

[73] Assignee: Race-Rail, Inc., Louisville, Ky.

[21] Appl. No.: 394,781

[22] Filed: Jul. 2, 1982

[51] Int. Cl.$^4$ .............................................. E04H 17/14
[52] U.S. Cl. ............................................. 256/65; 256/1; 403/2; 52/98
[58] Field of Search ................. 403/2, 229; 285/4; 256/59, 65, 1; 404/10; 52/98

[56] References Cited

U.S. PATENT DOCUMENTS

| | | | |
|---|---|---|---|
| 1,895,426 | 1/1933 | Young et al. | 285/4 |
| 1,985,322 | 12/1934 | La Clair | 256/1 |
| 2,249,848 | 7/1941 | O'Brien | 403/2 |
| 3,127,870 | 4/1964 | Bieber | 256/13.1 X |
| 3,349,531 | 10/1967 | Watson | 403/2 X |
| 3,439,947 | 4/1969 | Luckenbill et al. | 285/4 X |
| 4,007,919 | 2/1977 | Totten | 256/65 X |
| 4,270,873 | 6/1981 | Laehy et al. | 256/1 X |

FOREIGN PATENT DOCUMENTS

| | | | |
|---|---|---|---|
| 2445842 | 4/1976 | Fed. Rep. of Germany | 404/10 |
| 273893 | 3/1951 | Switzerland | 256/59 |
| 572131 | 1/1976 | Switzerland | 404/10 |
| 974055 | 11/1964 | United Kingdom | 256/59 |

*Primary Examiner*—Andrew V. Kundrat
*Attorney, Agent, or Firm*—Jon C. Winger

[57] ABSTRACT

A break-away fence rail and support post for a horse race track fence is constructed to give way when impacted with a predetermined force so as to provide a yieldable barrier upon impact by a horse or jockey. Further, a fence for a race track constructed to provide a smooth non-abrasive surface without projections or discontinuities.

17 Claims, 12 Drawing Figures

BREAK-AWAY FENCE FOR HORSE RACE TRACKS

BACKGROUND OF THE INVENTION

1. Field of the Invention

The present invention relates, generally, to fence posts and fence constructions, and more particularly to fence posts and fence constructions for horse race tracks, and the like.

2. Description of the Prior Art

Various post and fence constructions are known which are constructed in a manner to fail, break or bend under impact loads. The following is a list of United States Patents known to us which are directed to such post and fence constructions: U.S. Pat. Nos. 2,103,410; issued Dec. 28, 1937 to J. Frei, Jr; 2,141,067 issued Dec. 20, 1938 to E. B. Miller; 3,127,870 issued Apr. 7, 1964; to Herbert J. Henry; 3,628,296 issued Dec. 21, 1971 to Herbert J. Henry; 3,637,244, issued Jan. 25, 1972; to Richard A. Strizki; 3,837,752 issued Sept. 24, 1974 to John Scewchwk; 3,846,030 issued Nov. 5, 1974 to Herbert L. Katt 3,912,404 issued Oct. 14, 1975 to Herbert L. Katt; 3,912,405 issued Oct. 14, 1975 to Herbert L. Katt 3,951,556 issued Apr. 20, 1976 to Richard A. Strizki 3,967,906 issued July 6, 1976 to Richard A. Strizki 4,071,970 issued Feb. 7, 1978 to Richard A. Strizki 4,126,403 issued Nov. 21, 1978 to Lawrence J. Sweeney, et al. 4,270,873 issued June 2, 1981 to Peter Laehy, et al.

However, each of the post or fence constructions of the above-listed patents are deficient in one or more respects if they were to be used with a horse race track or the like.

U.S. Pat. Nos. 2,103,410; 2,141,067, and 4,270,873 are directed to spring loaded posts which pivot about their lower ends upon being impacted, and spring back to a vertical position after the impact load is removed.

U.S. Pat. Nos. 3,912,404; 3,912,405 and 4,126,403 are directed to post constructions which have separate break-away upper and lower post sections interconnected by metal straps which are to prevent the upper section from completely releasing from the lower section and flying off upon impact.

U.S. Pat. Nos. 3,637,244; 3,837,752; 3,951,556 and 3,967,906 are directed to an assembly for mounting a sign post on a stationary footing. The mounting includes a platform attached to the bottom end of the post. The platform is connected to the footing by break-away coupling members spaced radially outwardly from the vertical axis of the post.

U.S. Pat. No. 4,071,970 is directed to a break-away post construction wherein the break-away post is formed of separate upper and lower post sections. The upper and lower post sections are maintained in end to end coaxial abutment by means of two hinge plates. Each hinge plate in generally rectangular and planar in configuration with a notch extending across its width about which the hinge plate will bend or break. The two hinge plates are fixedly mounted on opposite sides of the post. When the post is impacted, the hinge plate mounted on the impact side of the post will rupture along the notch and the hinge plate mounted on the opposite side of the post will bend at the notch.

U.S. Pat. No. 3,846,030 is directed to a break-away post construction wherein the break-away post is formed of separate upper and lower sections held together in end to end relationship by a two-piece collar. The collar has a groove extending peripherially in the region of the juncture of the post sections.

U.S. Pat. No. 3,628,296 is directed to a break-away post composed of telescoping post sections supported in a longitudinally perforated ground anchor sleeve. A sign support post section, which is longitudinally perforated, is telescopially retained in the ground anchor sleeve by a bolt extending through aligned perforations in the anchor sleeve and support post section. The perforations of the post section at or immediately above the top surface of the the ground anchor sleeve provide a relatively weak break-away section.

U.S. Pat. No. 3,127,870 is directed to a break-away rail for race tracks which will instantly shatter upon contact by any excessive force. The vertical posts and horizontal rail supported between the posts are each formed in separate sections held together in end to end relationship by an arcuate plate spanning the abutting ends of the adjacent post sections and abutting ends of the adjacent rail sections. The plates are secured to the section ends by bolts which extend through both the plate and adjacent section ends. Each plate is formed with a groove at a location corresponding to the juncture of the abutting ends of the sections held together by that plate to provide a weakened section.

SUMMARY OF THE INVENTION

Typically, horse race tracks are generally oval and have fences along both the inner and outer margins to define the boundries of the racing surface and to confine the horses to the racing surface.

During a race, it is not uncommon for the horses to bunch up at the inner fence. This is particularly true in the turns because, of course, the inner radius is the shortest distance through a turn. It can occur that a horse will rub along, brush against and indeed, lean against the race rail of the fence as they race, and in doing so they can suffer an abrasive type injury.

Furthermore, in the excitement of a race the horses can bump into each other with the result that a horse can impact the fence with a sufficient force to cause a trauma-type injury to itself or its jockey, or to throw the jockey off the horse and onto the fence rail or support post.

It has also been known for horses to fall beneath the horizontal fence rail and, in their panic, stand-up while under the fence post rail subjecting themselves to possible severe injury.

At paramutual tracks, a broken fence must be rapidly repaired so that following races will not be cancelled or excessively delayed because if the following races are cancelled, or even delayed, the track stands to loose substantial amounts of money.

A further economic consideration is that a fence should be inexpensive to maintain.

The present invention recognizes these problems and provides a solution fulfilling the following objectives.

An object of the present invention is to provide a fence construction to diminish the likelihood of severe abrasive-type injury to a horse as it may rub along or brush against and bump into the fence rail, while remaining intact.

Another object of the present invention is to provide a fence post construction which is adapted to yieldably break-away under excessive impact loads due to a horse or jockey contacting the fence to diminish the likelihood of severe injury to the horse and/or jockey.

A further object of the present invention is to provide a horizontal rail construction which is adapted to give way in a generally upward direction in the event a fallen horse attempts to stand-up beneath the rail to diminish the likelihood of severe injury to the horse.

A still further object of the present invention is to provide a break-away fence construction which can be rapidly and economically repaired if it is broken so as not to delay subsequent races even if a substantial length of the fence is broken.

Yet another object of the present invention is to provide a break-away fence construction which is repairable or replaceable in most respects without the necessity of using any tools.

Yet a further object of the present invention is to provide a break-away fence construction which is attractive in appearance and substantially maintenance free unless broken.

More particularly, the present invention provides a break-away fence post embodying various features of the present invention comprising a hollow post section adapted to be anchored to the ground and extend generally perpendicularly therefrom, and means defining a groove formed in the wall of the post section, the groove circumscribing at least a portion of the periphery of the post.

The present invention further provides a break-away fence post embodying various features of the present invention comprising a break-away fence post having means defining a hollow interior; and means defining a plurality of spaced apart holes in the wall of said post, said holes being arranged in an array circumscribing at least a portion of the periphery of said fence post.

The present invention also provides a break-away fence post embodying various features of the present invention comprising a fence post support adapted to be anchored to the ground; a hollow, fence post section adapted to be releasably seated at one of its ends on the support, and, biasing means disposed within the hollow fence post section, the biasing means being connected to the fence post section and to the fence post support, the connection of the biasing means to support being releasable upon displacement of the fence post through predetermined angle to the vertical.

The present invention also provides a fence construction comprising a plurality of space apart fence posts supported by and projecting generally vertically upwardly from the ground; generally horizontal fence rails spanning the distance between said fence posts and supported by said fence posts; at least one of said fence posts having a hollow interior; means defining a groove formed in the wall of at least one of said hollow fence posts circumscribing a portion of the periphery of said fence post; and said at least one hollow fence post being oriented such that an imaginary straight line interconnecting the ends of said groove is at an acute angle to the general longitude of said fence rail attached to said at least one fence post.

The present invention further provides a fence construction comprising a plurality of spaced apart fence posts supported by, and projecting generally vertically upwardly form the ground; generally horizontal fence rails spanning the distance between said fence posts and supported by said fence posts; at least one of said fence posts having a hollow interior; means defining a plurality of spaced apart holes in the wall of said at least one post, said holes being arranged in an array circumscribing a portion of the periphery of said post; and said at least one post being oriented such that an imaginary straight line interconnecting the end holes of said array is at an acute angle to the general longitude of said fence rails attached to said at least one fence post.

The present invention further provides a fence construction of the type having a plurality of spaced apart generally vertical fence posts and at least one generally horizontal rail spanning the distance between adjacent posts, the improvement comprising resilient clamp means at the ends of said rails for releasably gripping said post.

BRIEF DESCRIPTION OF THE DRAWINGS

The above mentioned objectives and advantages of the present invention will become more clear upon reference to the following specification and drawings in which the numerals refer to the parts throughout the several views and wherein.

DETAILED DESCRIPTION OF THE EMBODIMENTS

Figure 1:
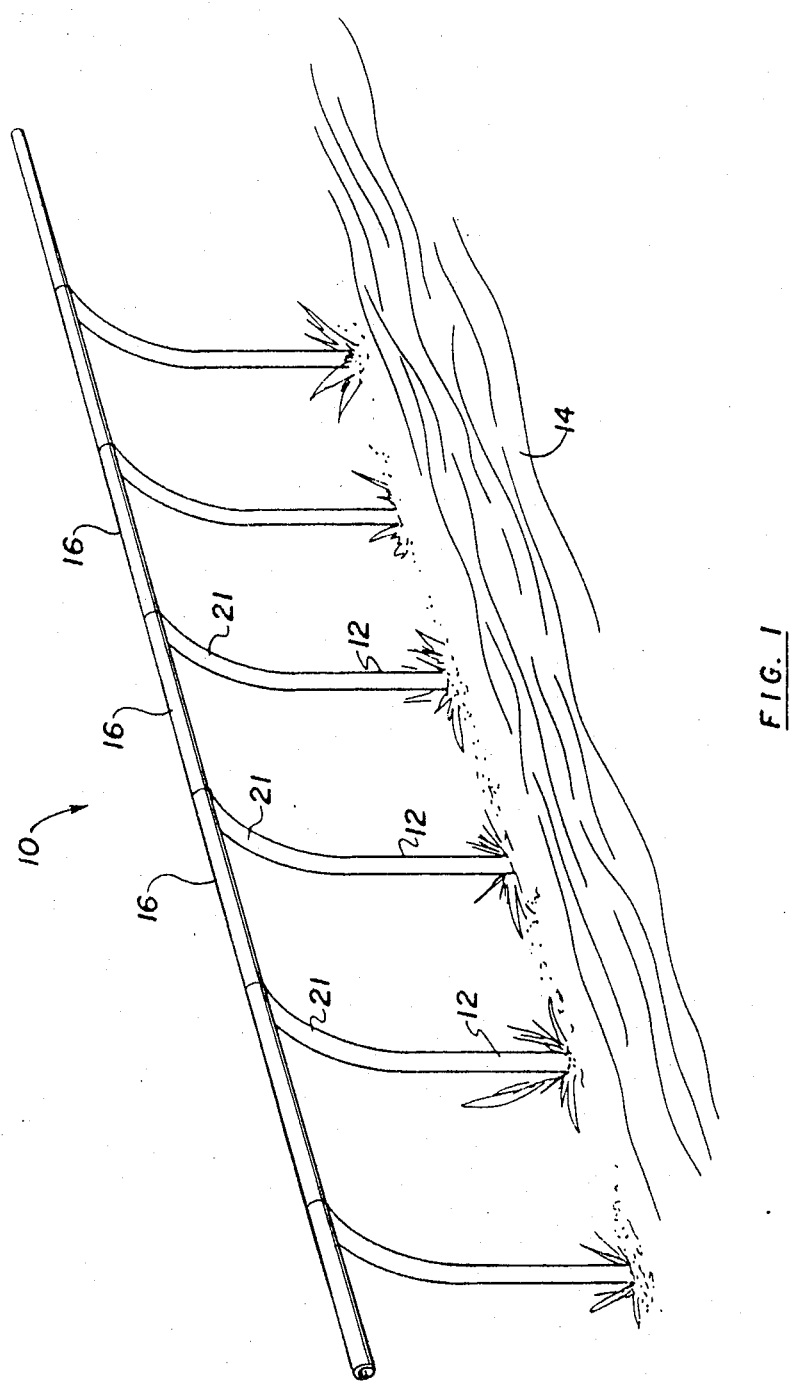
FIG. 1 is a perspective view of a portion of a horse race track having a fence incorporating various features of the present invention.

FIG. 1 illustrates a portion of a horse race track having a fence construction, generally denoted as the numeral 10, which embodies the various advantageous features of the present invention. The fence construction 10 comprises a plurality of generally vertically oriented, parallel break-away fence posts 12 at spaced apart intervals along the margin of the racing surface 14, and horizontally disposed fence rails 16 spanning the distance between and releasably connected to adjacent fence posts 12.

The fence construction 10 can be fabricated in virtually any size to accommodate the particular needs of different race tracks. For example, typically on racking tracks for throughbred horses, the fence posts 12 are on eight to ten foot centers and the horizontal fence rail 16 is thirty eight to forty two inches above the ground, while for harness horse race tracks the horizontal rail is about eighteen inches above the ground.

FIGS. 2 through 9 illustrate various advantageous embodiments of the break-away fence post 12 used in the fence construction of FIG. 1. For the sake of clarity, the break-away fence post is denoted as the numeral 112 in FIGS. 2 and 3, as the numeral 212 in FIG. 4, as the numeral 312 in FIG. 5 and as the numeral 412 in FIG. 6 as the numeral 512 in FIG. 7, as the numeral 612 in FIG. 8 and as the numeral 712 in FIG. 9.

Figure 2:
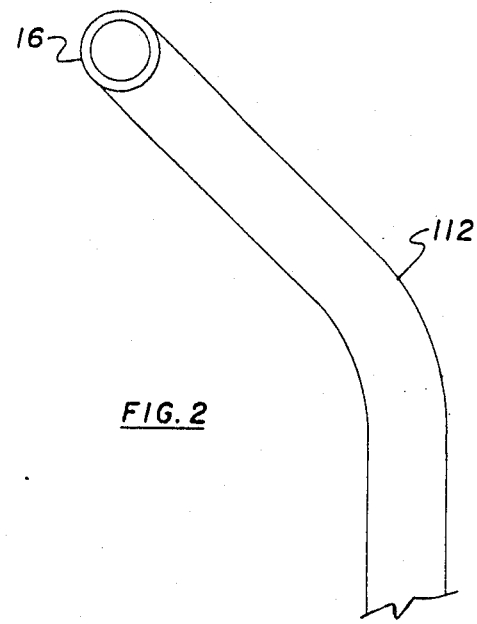
FIG. 2 is an elevational view of a break-away fence post embodying various features of the present invention and adapted to be incorporated into the fence of FIG. 1.
Figure 3:
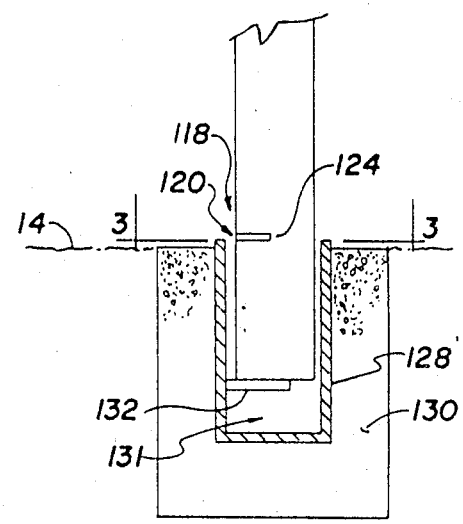
FIG. 3 is a transverse cross-sectional view of the post of FIG. 1 taken in the direction of arrows 3—3.
Figure 3:
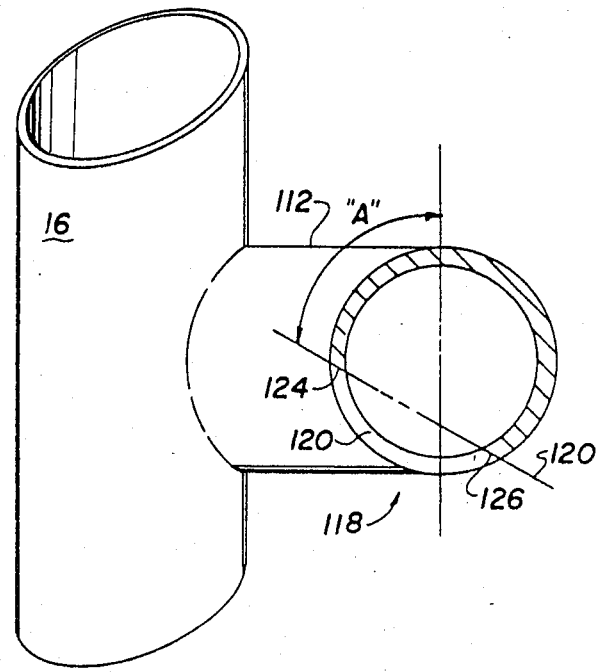

With reference to FIGS. 2 and 3, the break-away fence post 112 is shown as comprising a substantially cylindrical hollow post having a weakened zone 118 formed in its wall by means defining a groove 120. The groove 120 penetrates through the wall of the hollow cylindrical fence post 112, and an imaginary straight line 122 interconnecting the ends 124 and 126 of the groove 120 lays on a cord of the generally circular cross section of the cylindrical post 112. Further, the plane containing the groove 120 is generally perpendicular to the longitudinal axis of the post 112. With reference to FIGS. 1 and 3, when the fence post 112 is included in the fence construction 10, the imaginary straight line 122 interconnecting the ends 124 and 126 of the groove 120 is oriented at an acute angle "A" (see FIG. 3) to the longitude of the fence rails 16 attached to the fence post 112, and thus at an acute angle to the race track, and is in that surface of the post facing generally in the direction of the oncoming horses. Good results have been obtained by making this acute angle "A" on the order of 60 degrees.

Again with reference to FIG. 2, the fence post 112 is illustrated as being releasably anchored at its lower end to the ground next to the racing surface 14 by means of a cylindrical sleeve 128 which is embedded in a concrete footing 130. The top surface of the concrete footing 130 is preferably below the grade level, and the open top of sleeve 128 is preferably at grade level. The post 112 is coaxially received within the sleeve 128 with a slip fit so that post 112 is readily longitudinally upwardly removable from the sleeve 128. A radial clearance of about 1/32 of an inch between the outside wall surface of the post and inside wall surface of the sleeve 128 has been found to work well. To facilitate removal of the post 112 from the sleeve 128, the post or sleeve can be lightly coated with a lubricating grease or other suitable material.

With continued reference to FIG. 2, the post 112 extends part way of the length of sleeve 128 so that there is a longitudinally extending space 131 between the bottom end of the post 112 and the bottom end of the sleeve 128. The space 131 provides drainage for water which could freeze the fence post 112 to the sleeve 128 in cold weather, and also provide access to the bottom end of the post 112 for a pry-bar type tool in the event the bottom end portion of a broken post 112 does become frozen into the sleeve 128. The fence post can be located in the sleeve 128 by virtually any type of locating means, for example, a shoulder formed in the interior wall of the sleeve. For the sake of illustration, the post locating means is shown as being a locating pin 132 extending radially inwardly of the sleeve 128 from the sleeve wall and in abutment with the bottom end of the post 112. The fence post 112 is located within the sleeve 128 such that the groove 120 is substantially at grade level so that when the post 112 breaks at the weakened zone defined by the groove 120 very little, if any, of the broken post projects above the grade level.

The force typically applied by racing horses against the fence rail as they rub along, bump against and lean against the fence rail are directed or applied perpendicular to the fence rail. However, the horse will exert a greater force against the the fence rail when it literally runs into the fence hitting the fence rail at a generally acute angle to the rail. Thus, the groove 120 is advantageous in that it provides a control to the direction of the impacting force which will more readily break the rail post. That is, the fence post 112 will withstand a greater generally horizontal force applied generally perpendicular to the fence rail 116 before it breaks than it will a generally horizontal force applied to an acute angle to the race rail.

It has also been concluded that a jockey is more likely to be thrown from the horse when the horse hits the rail at an acute angle due the the sudden jar of the horse running into the rail, and that the thrown jockey will more than likely hit the fence rail at an acute angle. Thus, the groove 120 will also provide for the post 112 to break if the fence is impacted by a thrown jockey.

Therefore, the fence will withstand the normally expected forces exerted on it during a race, but will break away when impacted by the greater force of a horse hitting it at an acute angle to the rail or a thrown jockey hitting the fence.

Figure 4:
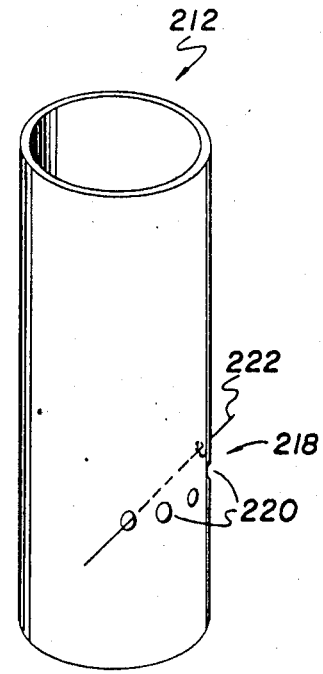
FIG. 4 is a perspective view of a portion of another advantageous break-away fence post embodying various features of the present invention and adapted to be incorporated into the fence of FIG. 1.

FIG. 4 illustrates a portion of the hollow break-away fence post 212 which is also substantially cylindrical and includes a weakened zone 218 which is defined by a semi-circular array of spaced apart holes 220 formed in the wall of the post such that an imaginary straight line 222 interconnecting the two end holes lays on a cord of the generally circular cross-section of the post 212. It should be understood that the holes 220 can be blind ended holes or can be found entirely through the wall of the post 212. As with the fence post 118 of FIGS. 2 and 3, when the fence post 218 is included in a fence construction the imaginary line 222 is preferably oriented at the acute angle "A" to the longitude of the fence rails.

Figure 5:
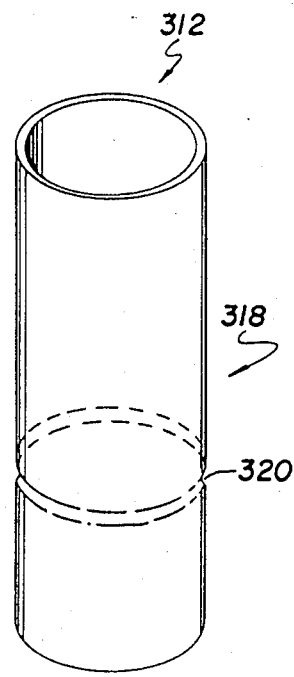
FIG. 5 is a perspective view of a portion of a further break-away fence post embodying various features of the present invention and adapted for incorporation into the fence of FIG. 1.

Turning now to FIG. 5, the fence post 312 is illustrated a being hollow and substantially cylindrical and having means defining a groove 320 to provide the weakened zone 318 to the fence post. Here, the groove 320 is formed in the outer wall surface of the post 312 and circumscribes the entire periphery of the post 312.

Figure 6:
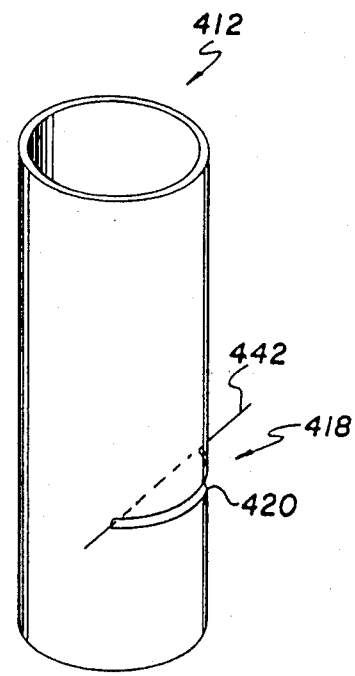
FIG. 6 is a perspective view of a portion of yet a further advantageous break-away fence post embodying various features of the present invention and adapted for incorporation into the fence of FIG. 1.

FIG. 6 illustrates a portion of the hollow cylindrical break-away fence post 412 wherein the weakened zone 418 formed in the wall of the post comprises a groove 420 formed in the outer wall surface of the post semi-circularly thereof. Similarly to the fence post 118 of FIGS. 2 and 3 and the fence post 212 of FIG. 4, an imaginary straight line 422 interconnecting the two ends of the groove 420 lays on a cord of the generally circular cross-section of the post 412. When the post 412 is included in a fence construction the imaginary line 422 is preferably oriented at the acute angle "A" to the longitude of the fence rails.

Figure 7:
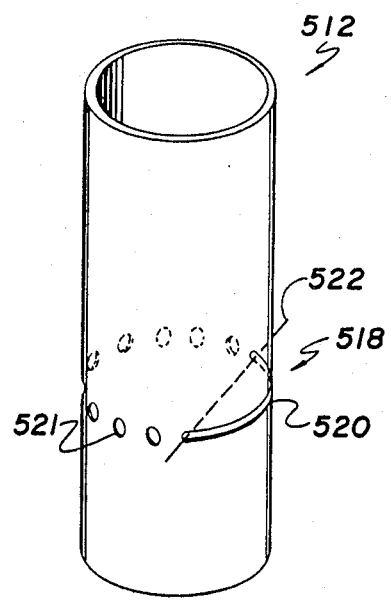
FIG. 7 is a perspective view of a portion of still a further advantageous breakaway fence post embodying various features of the present invention and adapted to be incorporation into the fence of FIG. 1.

FIG. 7 illustrates a portion of the hollow cylindrical fence post 512 wherein the weakened zone 518 is defined by means of a cordal groove 520 formed through the wall of the fence post and a series of spaced apart holes 521 formed in the wall of the post in the semi-circle between the ends of the cordol groove 520. An imaginary straight line 522 interconnecting the two ends of the groove 520 lays on a cord of the generally circular cross-section of the post 512. When the post 512 is included in a fence construction the imaginary line 522 is preferrably oriented at the acute angle "A" to the longitude of the fence rails.

Figure 8:
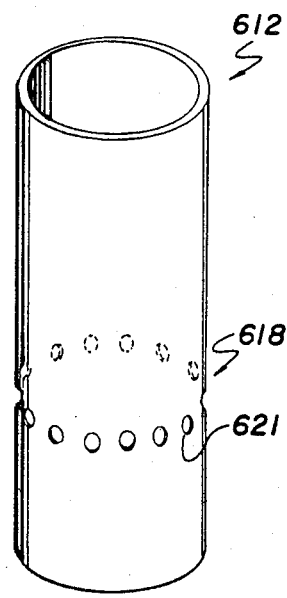
FIG. 8 is a perspective view of a portion of yet another advantageous breakaway fence post embodying various features of the present invention and adapted to be incorporated into the fence of Figure.

FIG. 8 shows a portion of the hollow fence post 612 which is also substantially cylindrical and includes a circumferential array of spaced apart holes 621 formed through the wall of the post 612 to provide the weakened zone 618 to the fence post.

Figure 9:
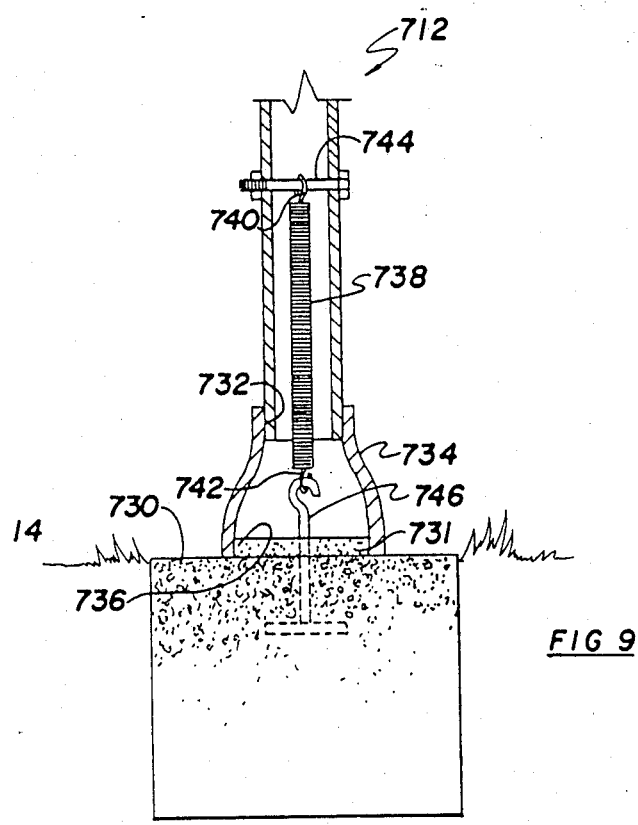
FIG. 9 is a transverse cross section of a portion of still another advantageous breakaway fence post embodying various features of the present invention and adapted to be incorporated into the fence of FIG. 1.

Turning now to FIG. 9, the break-away rail post 712 is shown as being hollow and substantially cylindrical. The fence post 712 is adapted to be releasably anchored at one of its ends to the ground. To accomplish this, a fence post support such as a concrete footing 730 is embedded in the ground. The footing 730 includes a generally cylindrical seat 731 projecting upwardly a short distance above the grade level of the ground. The bottom end of the post 712 fits into an aperture 732 in the small end of a bell shaped expander 734 and the opening 736 into the large end of the bell shaped expander 734 releasably receives the upwardly cylindrical seat 731 of the footing 730. Biasing means, such as a coil spring 738 is located within the interior of the hollow post 712 and is connected at one of its ends 740 to the post 712 and is releasably connected to the other end of its end 742 to the footing 730. As shown, the end 740 of the coil spring 738 is connected to the post 712 by means of a spring retainer pin 744 which is connected at its opposite ends to the walls of the post 712 and extends diametrically across the hollow cross-section of the post. The end 740 of the coil spring 738 includes a closed loop which receives the retainer pin 744. The other end 742 of the coil spring 738 is releasably connected to the footing 730 by means of, for example, a spring retainer hook 746 which is embedded into the footing 730 centrally of the cylindrical seat 731 and projects upwardly therefrom. The end 742 of the coil spring 738 includes a closed loop which receives the hooked section of the retainer hook 746. When included in a fence construction the retainer hook 746 is oriented so that the opening of the hooked end thereof faces generally away from the racing surface 14 of the race track. Thus, if a horse hits the fence at a predetermined force, or if a jockey thrown from a horse hits the fence, the fence will be displaced from the vertical adsorbing at least some of the energy to cushion the impact. Further, if the vertical displacement of the fence post reaches a predetermined angle to the vertical the looped end of 742 of the spring 738 will slide through the opening of the hooked section of the retainer hook 746 and the biasing means will thus be disconnected and/or released from the support footing so that the post will not spring back to a vertical position causing a secondary impact to the horse or jockey.

As shown in FIG. 1 the fence posts 12 each have an upper section 21 which projects in a generally cantilevered orientation in a direction generally toward the racing surface 14. The horizontal fence rails 16 spanning the distance between adjacent fence posts 12 are connected to the cantilevered end of the upper section 21. It is advantageous that at least the surfaces of the fence posts 12 and horizontal fence rails 16 exposed to the racing surface be smooth and without discontinuities so as to decrease the likelihood of abrasive type injury to a horse or its jockey. Toward this objective, and as shown in FIG. 10 the horizontal fence rails 16 which span the distance between adjacent fence post are each attached at one of its end to the free ends of the cantilevered upper section 21 of a fence post 12 by means of a hollow, generally T-shaped fitting 27 in a manner which provides a smooth, continuous surface without substantial discontinuities.

Figure 12:
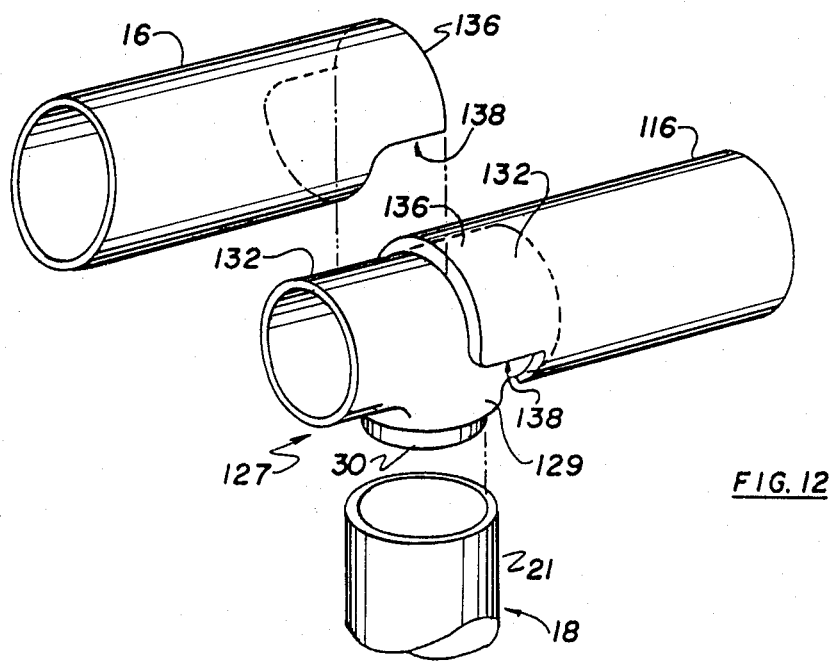
FIG. 12 is an enlarged, partially exploded perspective view similar to that of FIG. 11 but showing another advantageous connection of the present invention for connecting the fence rails to the fence posts.

As can be best seen in FIG. 12 the stem 29 of a T-shaped fitting 27 is generally cylindrical in transverse cross-section with an outside diameter substantially equal to the outside diameter of the cantilevered upper sections 21 of the post 12. The end of stem 29 includes a circumferential mounting flange 30 coaxial with, and extending outwardly from the end of the stem 29. The outside diameter of the circumferential mounting flange 30 is substantially equal to the inside diameter of the cantilevered upper section 21 of the post 12 and is coaxially received in the free cantilevered end of the upper section 21. Further, each arm 32 of the T-shaped fitting 27 is also hollow and generally cylindrical in transverse cross-section with an outside diameter substantially equal to the outside diameter of the horizontal fence rail 16 to be attached to the fence post. The end of each arm 32 includes a circumferential mounting flange 34 coaxial with, and extending outwardly from it. The outside diameter of the circumferential mounting flange 34 is substantially equal to the inside diameter of the horizontal fence rail 16 and is adapted to be coaxially, releasably received in the end of the fence rail.

Figure 10:
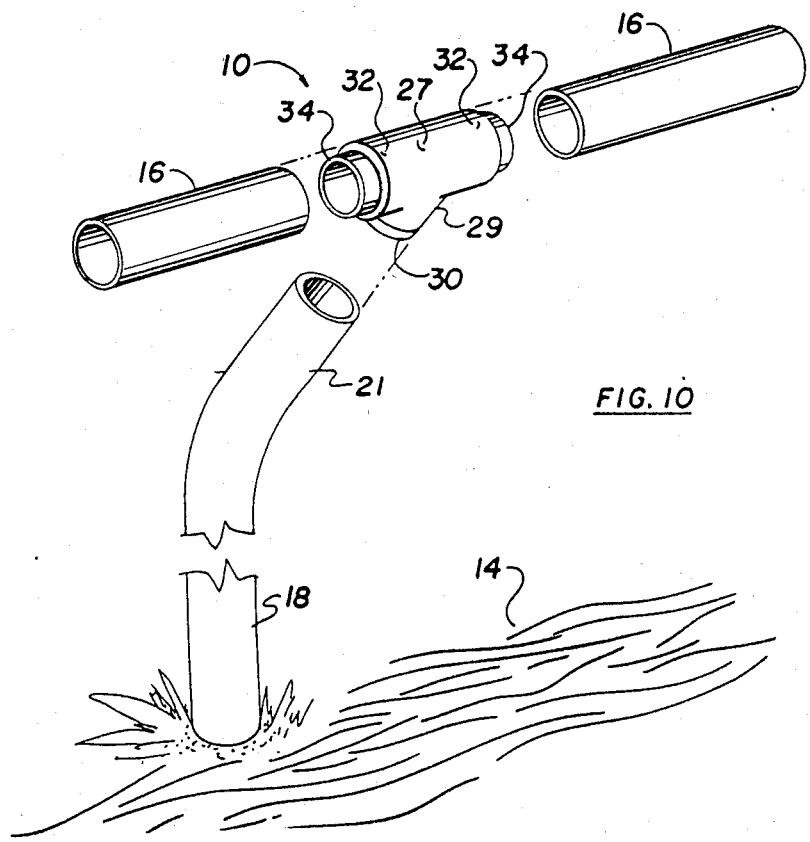
FIG. 10 is an enlarged perspective view of the top portion of a section of the fence of FIG. 1.
Figure 11:
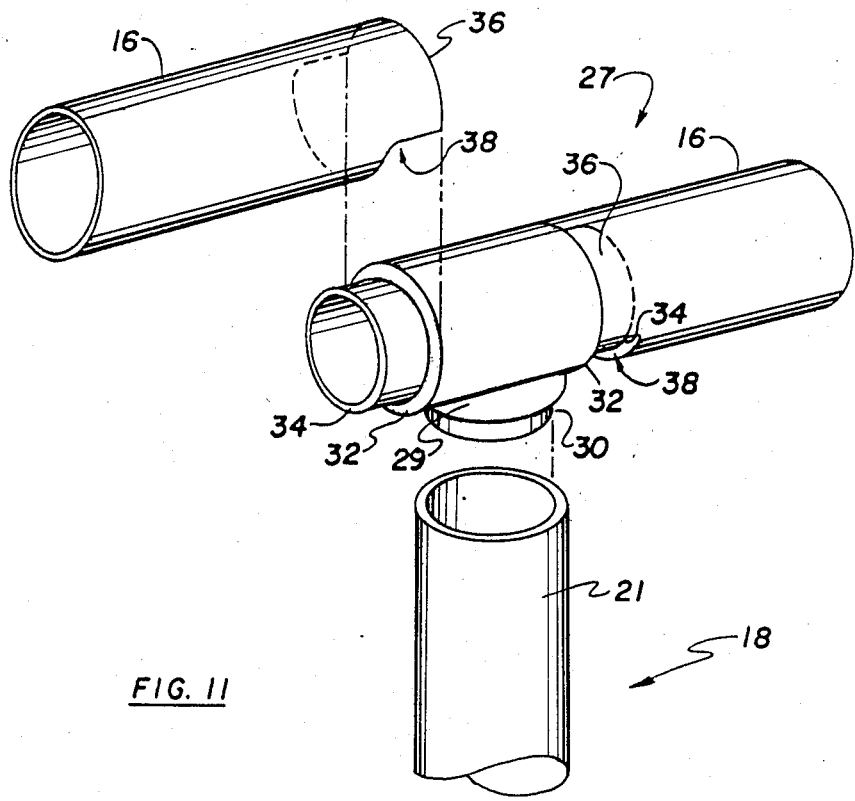
FIG. 11 an enlarged, partially exploded perspective view of the top area of FIG. 10 showing an advantageous connection of the present invention for connecting the fence rails to the fence posts.

FIG. 11 is an enlarged partially exploded perspective view of the top portion of FIG. 10 more clearly showing a preferred fence rail 16 and how it is releasably connected to the T-shaped fitting 27. As illustrated, a portion of the wall at each end of the rail 16 is removed back a distance from the rail end generally corresponding to the projecting length of circumferential mounting flange 34 of the T-shaped fitting 27 so that a generally U-shaped clamp 36 is defined by the remaining portion of the rail wall. Preferrably, the distance across the opening 38 into the U-shaped clamp 36 is smaller than the diameter of the circumferential mounting flange 30. The rail 16 is assembled to the T-shaped fitting 27 by orienting the rail 16 so that the U-shaped clamp 36 is inverted, i.e. the opening 38 faces the ground, and forcing the rail 16 downwardly so that the clamp 36 snaps over the circumferential mounting flange 30.

FIG. 12 is an enlarged partially exploded perspective view of top portion of a fence construction showing a fence rail 16 releasably connected to a somewhat different T-shaped fitting 127. As illustrated, a portion of the wall at each end of the rail 16 is removed back a distance from the rail end generally corresponding to the radius of the stem 129 of the T-shaped fitting 127 so that the arms 127 are completely receivable within the rails 16 while the distance across the opening 138 into the U-shaped clamp 136 is smaller than the diameter than the arms of 132 of the T-shaped fitting 127. The fence rails 16 are assembled to the T-shaped fitting 127 by orienting the rail 16 so the U-shaped clamp 136 is inverted, i.e. the opening 138 faces the ground, and forcing the rail 16 downwardly so that the clamp 136 snaps over the arms 132 of the T-shaped fitting 127. When the rails are assembled to the T-shaped fitting 127, the ends of the rails attached to the opposite arms 132 of a T-shaped fitting are in mutual abutment and the exterior wall surfaces of the rails are substantially coextensive totally enclosing the arms 132 of the T-shaped fitting 127.

In the event a horse falls beneath the rail 16 and attempts to stand-up, the rail 16 will release from the T-shaped fitting with a snap action in a generally upward direction.

The fence posts, fence rails and T-fitting are all preferrably fabricated of the same material. Further, the material is preferably somewhat flexible. Good results have been obtained by fabricating these fence components of a polyvinylchloride material, an ABS, and aluminum.

As it can be easily perceived from the foregoing description, the fence construction, and components thereof, of the present invention eminently fulfills all of the stated objectives, and provides a fence construction which is an advance over the prior art fence construction particularly adapted for use on horse racing tracks and the like.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

The invention claimed is:

1. A break-away fence post, comprising:
means defining a hollow interior, and
means defining a groove formed in the wall of said hollow post, said groove circumscribing only a portion of the periphery of said hollow posts and penetrating the wall of said hollow post.

2. The break-away post of claim 1, wherein an imaginary straight line interconnecting the ends of said groove lays on a chord of said generally cylindrical post.

3. The break-away post of claim 2 further comprising a plurality of spaced apart hole through the wall of said post and arranged in a semi-circular array extending between the ends of said groove.

4. A break-away fence post comprising:
means defining a hollow interior; and
means defining a plurality of spaced apart holes in the wall of said post, said holes being arranged in an array circumscribing at least a portion of the periphery of said fence post for providing a weakened zone in said fence post.

5. The break-away post of claim 4 wherein:
said post is substantially cylindrical;
said holes are arranged in a semi-circular array; and,
an imaginary line interconnecting the end holes of said semi-circular array lays on a chord of said generally cylindrical post.

6. The break-away post of claim 5, wherein said holes are formed through the wall of said post.

7. The break-away fence post of claim 5 wherein said holes are blind ended.

8. A break-away fence post construction, comprising:
a fence post support adapted to be anchored to the ground;
a hollow fence post adapted to be releasably seated at one of its end on said support; and
biasing means disposed within said hollow fence post, said biasing means being connected to said fence post and to said fence post support, the connection of said biasing means to said support being releasably upon displacement of said fence post through a predetermined angle from the vertical 9. A fence construction comprising:
a plurality of spaced apart fence posts supported by and projecting generally vertically upwardly from the ground;
generally horizontal fence rails spanning the distance between said fence posts and supported by said fence posts;
at least one of said fence posts having a hollow interior;
means defining a groove in the wall of at least one of said hollow fence posts circumscribing a portion of the periphery of said fence posts; and
said at least one hollow fence post being oriented such that an imaginary line interconnecting the ends of said groove lays on a chord of the fence post and the chord is at an acute angle to the longitudinal axis of said fence rail attached to said at least one fence post.

10. The fence construction of claim 9 wherein said groove penetrates through the wall of said at least one hollow fence post.

11. A fence construction of claim 9, wherein said horizontal fence rails are releasably connected to said fence posts.

12. The fence construction of claim 9 wherein:
said fence posts are releasably supported in the ground.

13. A fence construction comprising:
a plurality of spaced apart fence posts supported by, and projecting generally vertically upwardly from the ground;
generally horizontal fence rails spanning the distance between said fence posts and supported by said fence posts;
at least one of said fence posts having a hollow interior;
means defining a plurality of spaced apart holes in the wall of said at least one post, said holes being arranged in an array circumscribing a portion of the periphery of said post; and
said at least one post being oriented such that an imaginary straight line interconnecting the end holes of said array lays on a chord of said fence post and the chord is at an acute angle to the longitudinal axis of said fence rails attached to said at least one fence post.

14. The fence construction of claim 13, wherein said horizontal fence rails are releasably connected to said fence posts.

15. A fence post construction comprising:
a plurality of spaced apart fence posts releasably supported in the ground;
generally horizontal fence rails spanning the distance between said fence posts; and,
means for releasably supporting the fence rails to the top end of the fence post, said releasable supporting means releasing support of the fence rail in a coaxial generally upward direction of the fence post.

16. In a fence construction of the type having a plurality of spaced apart generally vertical fence posts and at least one generally horizontal rail spanning the distance between adjacent posts, the improvement comprising generally U-shaped resilient clamp means at the ends of said rails for releasably gripping said post.

17. In a fence construction of the type having a plurality of spaced apart generally vertical fence posts, and at least one generally horizontal rail spanning the distance between adjacent posts, the improvement comprising:
- at least one arm extending outwardly from each of said fence posts; and
- resilient clamp means at the ends of said rails for releasably gripping said arm releasably connecting said rail to said post.

* * * * *